L. BURRELL.
MILKING MACHINE.
APPLICATION FILED JUNE 15, 1914.
1,111,562.
Patented Sept. 22, 1914.
2 SHEETS—SHEET 1.
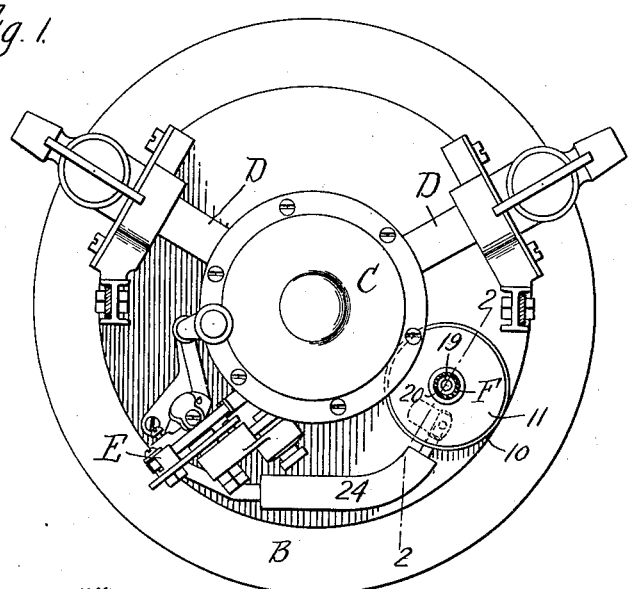
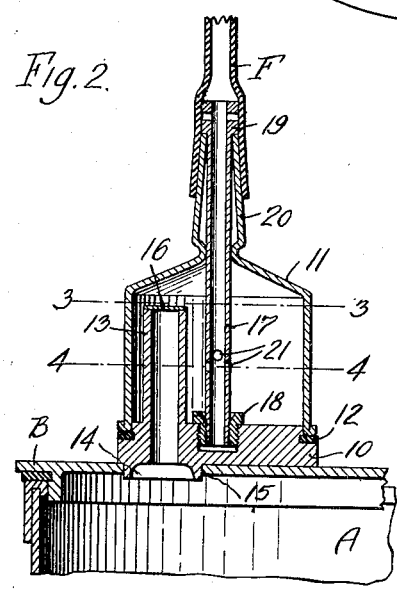
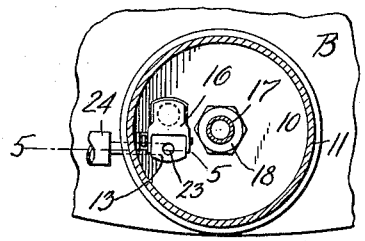
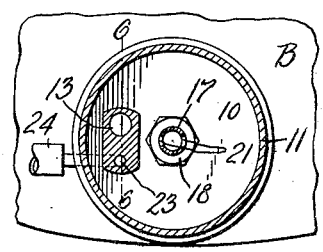
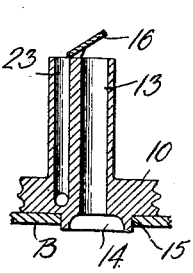
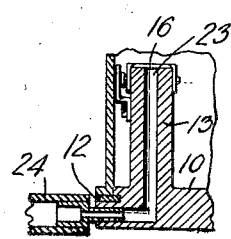
Witnesses.
Inventor.
Loomis Burrell
by Wilhelm Parker
Attorneys.

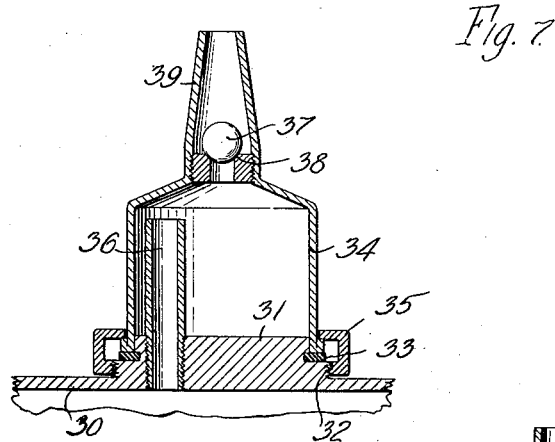
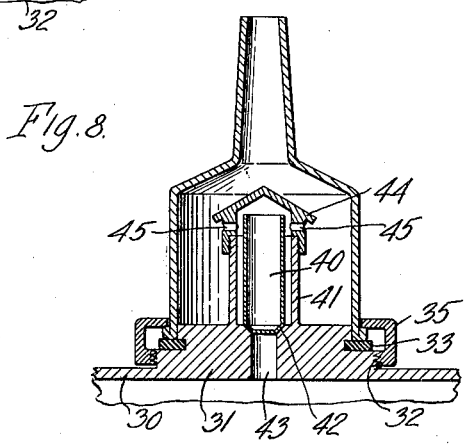
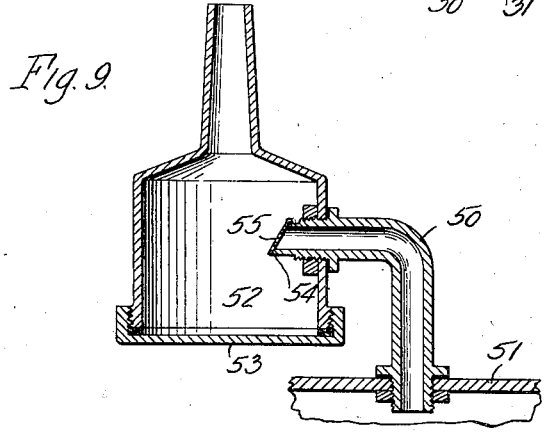

UNITED STATES PATENT OFFICE.

LOOMIS BURRELL, OF LITTLE FALLS, NEW YORK, ASSIGNOR TO D. H. BURRELL & COMPANY, OF LITTLE FALLS, NEW YORK.

MILKING-MACHINE.

1,111,562.

Specification of Letters Patent. Patented Sept. 22, 1914.

Application filed June 15, 1914. Serial No. 845,064.

*To all whom it may concern:*

Be it known that I, LOOMIS BURRELL, a citizen of the United States, residing at Little Falls, in the county of Herkimer and State of New York, have invented a new and useful Improvement in Milking-Machines, of which the following is a specification.

This invention relates to milking machines which are operated by suction applied to the milk receptacle. In milking machines of this kind a certain amount of liquid gathers in the suction tube which connects the milk receptacle with the suction pump or other air exhausting means. When the operation of milking is finished and the suction tube is disconnected from the milk receptacle, the inrush of air is liable to carry some of this liquid back into the milk receptacle, which is objectionable for various reasons.

The principal object of this invention is to provide the milk receptacle with a trap and check valve which will prevent the return of such liquid into the milk receptacle.

In the accompanying drawings: Figure 1 is a top plan view of a milk pail embodying this invention. Fig. 2 is a sectional elevation of the preferred form of trap and check valve on line 2—2, Fig. 1, on an enlarged scale. Figs. 3 and 4 are sectional plan views on lines 3—3 and 4—4, respectively, Fig. 2. Fig. 5 is a fragmentary sectional elevation on line 5—5, Fig. 3. Fig. 6 is a fragmentary sectional elevation on line 6—6, Fig. 4. Figs. 7, 8 and 9 are sectional elevations illustrating modified embodiments of the invention.

Referring to Figs. 1-6, A represents the milk pail or vessel, B the cover thereof on which the pulsating mechanism and other parts are mounted; C the pulsator for intermittently producing suction in the milk tubes D D; E the valve mechanism of the pulsator; and F the suction tube which connects with an exhaust tank or other apparatus for applying suction to the pail. All of these parts may be of any usual or suitable construction.

The suction is transmitted from the tube F into the milk receptacle through a trap which is provided with a check valve for preventing the sudden rush of air through the trap into the receptacle when the suction tube is disconnected from the pail. This trap is constructed as follows: 10 represents the base which is suitably secured to the cover B of the milk vessel, for example, by soldering. A bell-shaped housing 11 is secured to the base and a gasket 12 is interposed for forming an air-tight connection between the housing and the base. 13 represents an upright suction pipe which is arranged within the housing and is preferably formed integrally with the base. This pipe opens downwardly through the base into the pail and has its open upper end arranged within the housing at such an elevation above the base thereof that the liquid which is liable to accumulate in the trap around this pipe is not liable to reach the open upper end of this pipe in the ordinary use of the apparatus. An annular collar 14 is preferably formed on the base around the lower end of the pipe 13 and extends into an opening 15 in the cover B for securely holding the base of the trap on the cover B. This collar preferably extends below the cover to form a shoulder which intercepts the drops of milk which collect on the under surface of the cover and causes them to drop off into the pail instead of following the suction into the pipe 13.

The upper end of the elevated suction pipe 13 is provided with a check valve 16 which closes under external pressure and which may be of any desired construction. The valve shown in Figs. 2, 3, 5 and 6 is pivoted to the upper end of the pipe 13 and comprises a flat body or plate which seats itself upon the upper end of the pipe 13 to close the same but opens when suction is applied to the pipe.

Any suitable means may be employed for securing the housing of the trap to the base thereof. In the construction shown in Fig. 2, a pipe 17 extends centrally through the housing and is screwthreaded at its lower end and engaged in a threaded bushing 18 secured in the base of the trap. The pipe 17 has a shouldered upper portion 19 which bears against the upper end of the tapering nipple 20 of the housing to which the suction tube F is attached and presses the housing against the gasket 12 when the threaded end of the pipe 17 is screwed into the bushing. This central pipe also serves to establish communication between the suction tube F and the interior of the trap, the pipe being provided with openings 21 in its lower portion through which the air is drawn from the trap into the pipe. For applying or removing the central pipe, it can be turned by means of a nail or other device inserted through a transverse opening near the upper end of the pipe.

The suction pipe 13 is preferably formed with a secondary passage 23 which is open at its upper end not controlled by the valve 16. This passage is connected at its lower end to a tube 24 leading to the valve mechanism of the pulsator.

In the operation of the device, the liquid which is deposited in the suction tube and in the housing 11 will gather on the bottom of the trap. When the operation of milking is finished and the suction tube F is detached from the milk pail, a rush of air through the trap into the milk pail is prevented by the closing of the check valve, and the liquid which has been collected in the trap is not carried back into the milk pail, which would be liable to occur if a powerful air current rushing downwardly through the trap stirred up the collected liquid, atomized the same and so carried it back to a greater or less extent into the milk pail. It is not necessary that the valve should fit tightly because in any event the valve would prevent such a violent rush of air through the trap as would cause liquid to be carried from the trap into the milk pail. The trap can be easily taken apart for cleaning and repairs. Upon removing the housing all parts of the trap are readily accessible. The trap positively prevents any of the liquid which is deposited in the suction passage from being returned to the milk receptacle.

Referring to the modified construction represented in Fig. 7, 30 represents the top plate of the milk vessel which is provided with a raised circular base 31 for the trap having an external screw thread 32 and a seat for a packing ring 33 upon which the housing 34 is clamped by an annular nut 35. The elevated suction pipe 36 is secured in the base by soldering or otherwise. 37 represents the check valve, which is in this construction a ball valve, resting upon a seat 38 secured by a screw thread or otherwise within the lower portion of the nipple 39 of the trap.

Referring to the modified construction represented in Fig. 8, the construction of the housing and the devices by which the same is secured to the base are substantially the same as represented in Fig. 7, but the check valve 40 is arranged within the elevated suction pipe 41 and seats itself against a seat 42 formed in the base at the upper end of a bore or passage 43 which forms a downward continuation of the bore of the suction pipe. The upper end of the suction pipe is protected by a cap 44 having side openings 45 which establish communication between the interior of the suction pipe and the surrounding space of the trap. The check valve may be constructed in the form of a hollow shell.

Referring to the modified construction represented in Fig. 9, 50 represents the suction pipe which rises from the top plate 51 of the milk vessel and has the form of an elbow, the upper horizontal part of which is screw threaded for the reception of the trap housing 52. The upper portion of this suction pipe extends into the housing at a suitable distance above the removable bottom 53 thereof and has an oblique face 54 which forms a seat for a check valve 55 hinged to the end of the pipe.

I claim as my invention:

1. In a milking machine, the combination with a milk vessel, of a trap provided with means for applying suction thereto and to said milk vessel, said trap comprising a receptacle for intercepted liquid and a check valve which closes under external pressure and prevents the inrush of air through the trap to the milk vessel when the suction is disconnected from the trap.

2. In a milking machine, the combination with a milk vessel, of a suction trap comprising a receptacle for intercepted liquid, a suction pipe communicating at one end with said vessel and at the other end with said liquid receptacle at an elevation above the bottom thereof, and a check valve which prevents the passage of air through the trap toward the milk vessel.

3. In a milking machine, the combination with a milk vessel, of a suction trap comprising a receptacle for intercepted liquid, a suction pipe connecting said trap with said vessel and communicating with said liquid receptacle at an elevation above the bottom thereof, and a check valve arranged at the elevated end of said suction pipe.

4. In a milking machine, the combination with a milk vessel, of a suction trap comprising a housing having at its top a nipple adapted to receive a suction tube, an upright suction pipe arranged within said housing and communicating at its lower end with said milk vessel and at its upper end with the interior of said housing, and a check valve which prevents the flow of air through said trap toward the milk vessel.

5. In a milking machine, the combination with a milk vessel, of a trap mounted thereon and comprising a housing, a suction pipe projecting upwardly from said vessel and communicating with said housing above the bottom thereof, and a check valve which prevents the flow of air through said trap and suction pipe into said vessel.

6. In a milking machine, the combination with a milk vessel, of a trap mounted on the same and comprising a housing, a suction pipe which communicates at its lower end with said vessel and extends above the base of the trap, and a check valve arranged at the upper end of said pipe.

7. The combination with a milk vessel, of a trap mounted thereon and comprising a base, a suction pipe secured to said base and projecting above the same, a housing removably applied to said base and inclosing said suction pipe, and means for securing said housing to said base.

8. In a milking machine, the combination with a milk vessel, of a trap comprising a base, a suction pipe projecting upwardly from the base and communicating with said milk vessel, a valve adapted to check the flow of air through said pipe into the receptacle, a housing inclosing said suction pipe and valve, and means for releasably clamping said housing to said base.

9. The combination with a milk vessel, of a trap mounted thereon and comprising a base, a suction pipe secured to said base and projecting above the same, a housing removably applied to said base and inclosing said suction pipe, an attaching pipe secured to said base and extending through said housing, and means on said pipe for securing said housing to said base.

10. The combination with a milk vessel, of a trap mounted thereon and comprising a base, a suction pipe secured to said base and projecting above the same, a housing removably applied to said base and inclosing said suction pipe, an attaching pipe secured to said base and extending through said housing, means on said pipe for securing said housing to said base, and a check valve applied to said suction pipe.

11. In a milking machine, the combination with a milk vessel, of a trap housing, means for applying suction to the same, a suction pipe connected with said vessel and opening within said housing, a check valve on said suction pipe, and a secondary suction passage opening within said housing independently of said valve-controlled suction pipe and adapted to be connected with a pulsator.

Witness my hand in the presence of two subscribing witnesses.

LOOMIS BURRELL.

Witnesses:
C. G. STINGER,
CHARLES B. DALZELL.